US010481907B1

(12) United States Patent
Deol et al.

(10) Patent No.: US 10,481,907 B1
(45) Date of Patent: Nov. 19, 2019

(54) METHOD OF AUTOMATICALLY INVOKING APPLICATION PROGRAM FUNCTIONS FOR A DEFINED PROJECT AND GENERATING ACTIVITY AND REPORT DATA FOR PROGRESS IN THE PROJECT

(71) Applicant: Coupa Software Incorporated, San Mateo, CA (US)

(72) Inventors: Steve Deol, San Francisco, CA (US); Scott Harris, Menlo Park, CA (US)

(73) Assignee: Coupa Software Incorporated, San Mateo, CA (US)

( * ) Notice: Subject to any disclaimer, the term of this patent is extended or adjusted under 35 U.S.C. 154(b) by 6 days.

(21) Appl. No.: 16/035,484

(22) Filed: Jul. 13, 2018

Related U.S. Application Data

(63) Continuation of application No. 15/431,698, filed on Feb. 13, 2017, now Pat. No. 10,055,223.

(51) Int. Cl.
*G06F 8/77* (2018.01)
*G06Q 10/06* (2012.01)
(Continued)

(52) U.S. Cl.
CPC .............. *G06F 8/77* (2013.01); *G06F 3/0482* (2013.01); *G06F 8/65* (2013.01); *G06F 8/71* (2013.01); *G06Q 10/067* (2013.01)

(58) Field of Classification Search
None
See application file for complete search history.

(56) References Cited

U.S. PATENT DOCUMENTS 9,678,857 B1\* 6/2017 Nitta ..................... G06F 16/287
2011/0289475 A1\* 11/2011 Sukhenko ................ G06F 8/20
717/103

(Continued)

OTHER PUBLICATIONS

Deol, U.S. Appl. No. 15/431,698, filed Feb. 13, 2017, Notice of Allowance, dated May 17, 2018.

*Primary Examiner* — Francisco J Aponte
*Assistant Examiner* — Mark A Gooray
(74) *Attorney, Agent, or Firm* — Hickman Palermo Becker Bingham LLP

(57) ABSTRACT

A data processing method including, in a procurement application program, generating and causing displaying as part of a graphical user interface of a client computer, a user interface widget that is programmed to list a plurality of different project identifiers; receiving first input indicating a selection of a particular project identifier representing a project managed using the procurement application program from among the plurality of different project identifiers; in response to the first input, retrieving from a database, a particular self-executing project table that corresponds to the particular project identifier, from among a plurality of digitally stored self-executing project tables, wherein the particular self-executing project table comprises: header data; a plurality of action identifiers of a plurality of different actions that are available in the procurement application program and that are associated with executing the particular self-executing project table; a plurality of different configuration parameter values for configuring the procurement application program to execute the project; and a plurality of dashboard data configuration values; based on retrieving the particular self-executing project table: automatically applying the plurality of different configuration parameter values to result in configuring the procurement application program to execute the project, automatically generating a list of the (Continued)

plurality of different actions that are available in the procurement application program and that are associated with executing the project, based on the plurality of dashboard data configuration values, automatically generating a data dashboard in a graphical user interface that displays then-current values of data variables that are maintained by the procurement application program and that are associated with executing the project, asynchronously receiving second input selecting a particular action from among the different actions from the list, in response to the second input, executing the particular action with the procurement application program and updating the data dashboard in the graphical user interface based upon changes in the dashboard data configuration values that result from executing the particular action.

20 Claims, 5 Drawing Sheets

(51) Int. Cl.
*G06F 8/65* (2018.01)
*G06F 8/71* (2018.01)
*G06F 3/0482* (2013.01)

(56) References Cited

U.S. PATENT DOCUMENTS

| | | | |
|---|---|---|---|
| 2014/0032685 A1* | 1/2014 | Takahashi | H04L 51/00 709/206 |
| 2015/0286980 A1* | 10/2015 | Shusterman | G06Q 10/063114 705/7.15 |
| 2018/0232227 A1 | 8/2018 | Deol | |

* cited by examiner

METHOD OF AUTOMATICALLY INVOKING APPLICATION PROGRAM FUNCTIONS FOR A DEFINED PROJECT AND GENERATING ACTIVITY AND REPORT DATA FOR PROGRESS IN THE PROJECT

BENEFIT CLAIM

This application claims the benefit under 35 U.S.C. § 120 as a Continuation of application Ser. No. 15/431,698, filed Feb. 13, 2017, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to computer-implemented systems and techniques for processing self-executing project tables and, more specifically, to selecting actions to assist in processing self-executing project tables.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software may provide a variety of actions that allow users to manipulate their data for different purposes, in ways that previously were simply too laborious or near impossible to implement manually before being embodied in software. Software may include multiple actions that perform the same or nearly the same purpose, even within a particular piece of software. However, as computer program applications become complex, they may contain many functional operations that users do not effectively utilize.

For example, arranging purchases of goods or services is a common task in business enterprises, and companies often use a computer-based procurement system to manage creating, reviewing, approving, and communicating requests to purchase items in coordination with suppliers or vendors. These systems can be complex, with numerous features, functions, tasks and operations available at many different screen displays. Further, once users use a particular way of doing things, such as repeatedly using actions they are accustomed to for a particular purpose, it is often difficult to convince users to change and try different actions. For example, the procurement system for an organization may include an invoicing feature, but when a new action is introduced in the procurement software related to the invoicing feature, the new action may not be adopted by users, even when the new action provides new technical benefits. There may be compelling technical or business reasons why an administrator or manager would like to promote use of the new action throughout an organization. Examples include more efficiently processing invoices, more secure mechanisms for transfer of information, and greater transparency into the invoicing process. Therefore, there is a need for a technical process that induces adoption of the new actions to result in better technical performance. An enterprise that is using the procurement system also may wish to facilitate the use of new functions by employees of the enterprise, but in current practice there is no simple automated process to organize the new functions that are available and track the progress of users in adopting and using them.

DETAILED DESCRIPTION

Figure 1:
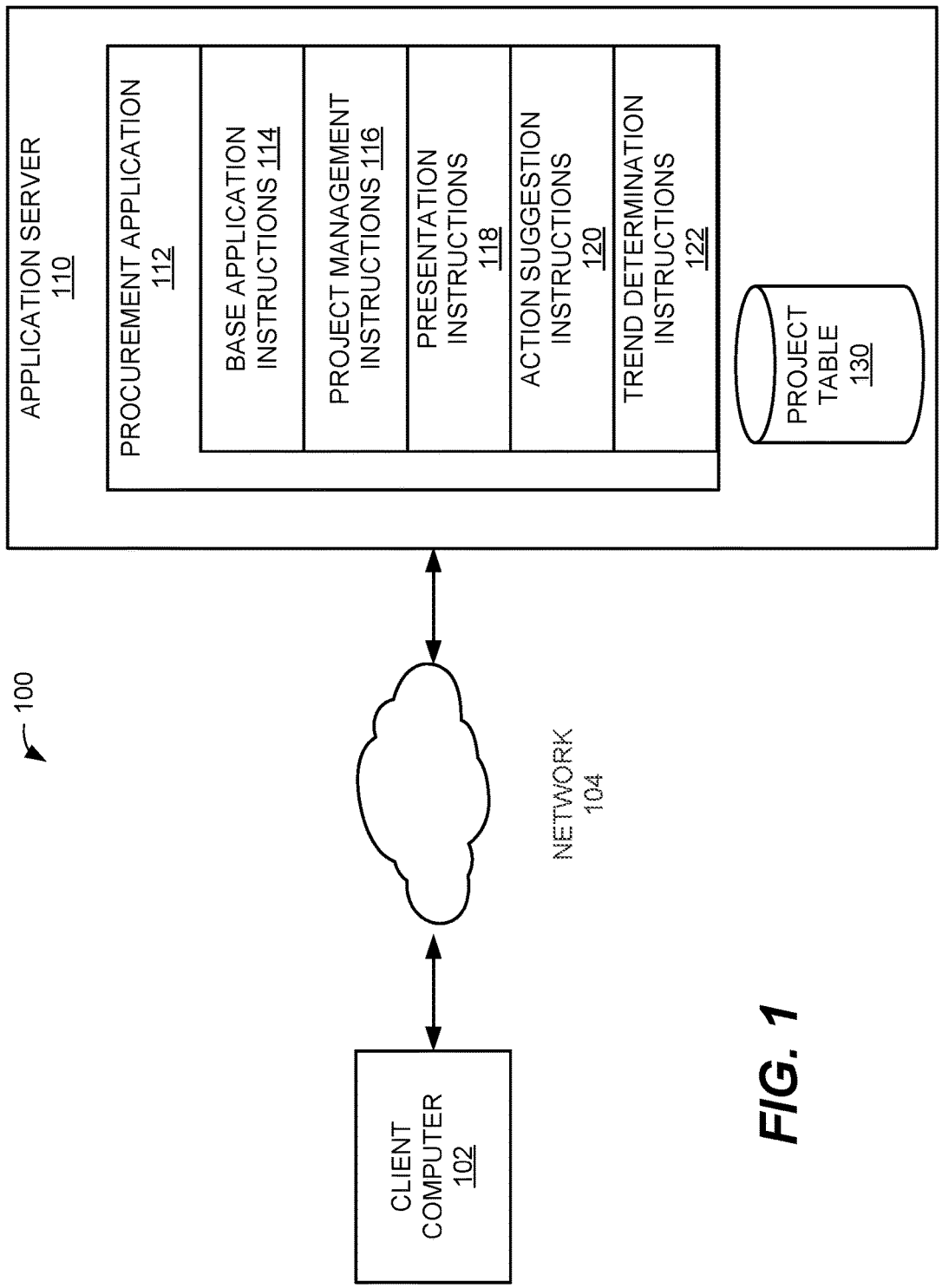
FIG. 1 is a block diagram of example networked computer systems that can be used in one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the context of working with a project action proposal system executing on an application server. However, it is understood that an application server is only a specific type of system, of which there are others, which may host or support the project action proposal system. For example, the same principles as discussed in this application would be applicable to alternative systems where the project action proposal system executes on one or more computing devices that may simultaneously execute computing instructions for additional systems.

Headings used in this application are provided merely for reference purposes. Features discussed following each heading do not limit the features as being required by a specific embodiment identified by each heading and do not limit the features as solely belonging to any specific embodiment identified by each heading.

1. General Overview

In a procurement system, periodic software development operations may result in adding new actions to the procurement system. There may be existing actions that satisfy the same or similar purposes as the new actions. The processes described herein may promote the use of new actions that have been added, even when another existing action may be selected, so that the new action may be adopted for use in a project. The processes also permit defining a set of application program actions as a project and tracking the adoption and use of those actions by user computers as a measure of successful completion of the project.

In an embodiment, a data processing method used with a procurement application program includes a project action proposal system, which may be implemented using one or more computer programs, methods or other software elements that are integrated into an existing application program or suite, including but not limited to a procurement system. Thus the project action proposal system of this disclosure may be implemented as a set of instructions that are either integrated into a larger system or run in concert with it. The project action proposal system includes generating and causing display, as part of a graphical user interface of a client computer, a user interface widget that is programmed to list different project identifiers. The project action proposal system may receive first input indicating a selection of a particular project identifier representing a project that is managed using the procurement application program from among the different project identifiers. For example, the procurement application program may manage data relating to more than one project. Depending on a permission level associated with the client computer, all of the projects or a subset of the projects may be available for selection as part of the graphical user interface.

In response to the first input, the project action proposal system may retrieve from a database, a particular self-executing project table that corresponds to the particular project identifier, from among a plurality of digitally stored self-executing project tables. For example, each self-executing project table stored in the database may represent a project or part of a project that is managed by the procurement application program. The particular self-executing table may include data associated with the project such as header data, identification information or action identifiers of different actions that are available in the procurement application program and that are associated with executing the particular self-executing project table, different configuration parameter values for configuring the procurement application program to execute the project, and dashboard data configuration values.

Based on retrieving the particular self-executing project table, the project action proposal system may automatically apply the different configuration parameter values to result in configuring the procurement application program to execute the project. The configuring may or may not include executing the project at this stage. The project action proposal system automatically generates a list of different actions that are available in the procurement application program and that are associated with executing one or more purposes that need to be satisfied before completing the project. For example, each executable instruction set may include one or more instructions corresponding to an action that allows satisfaction of one of the purposes.

Based on the dashboard data configuration values, the project action proposal system automatically generates a data dashboard in a graphical user interface that displays then-current values of data variables that are maintained by the procurement application program and that are associated with executing a purpose associated with the project. The project action proposal system may determine one or more additional different actions that may be used to execute the project. For example, there may be a default selection of an action or an initial action already associated with executing the project. The default action may be specified by an administrator of the project action proposal system when setting up the project action proposal system. The initial action may also be specified by any user that accessed the project previously, such as a project creator, project manager, or project contributor. The project may be partially completed using the initial action, before determining the additional different actions. For example, the initial action may have partially executed and reflected in the then-current values.

After causing display of the graphical user interface, in one example, the project action proposal system asynchronously receives second input selecting a particular action from among the different actions from the list. In response to the second input, the project action proposal system executes the particular action with the procurement application program and updates the data dashboard in the graphical user interface based upon changes in the dashboard data configuration values that result from executing the particular action. The project action proposal system may further include causing display in the same graphical user interface, an information feed of output from the procurement application program resulting from executing the particular action. In this way, the techniques herein can automatically track and generate reports about advancement of a project in which user computers are required to select, use and execute different functions of an application program such as a procurement system.

In an embodiment, the project action proposal system may include stored digital data that changes based on the second input. The changes may include a list of all transactions that the procurement application program has executed related to the project; one or more transaction status changes; one or more comments on transactions that have been entered by users; updated information on transactions; one or more comments on the project that have been entered by other users; one or more tasks related to the project; one or more updates to tasks. For example, the different configuration parameter values may include one or more of an entity identifier, a numerical resource cost, or commodity type identifier. Further, the header data may include a project identifier corresponding to at least two actions that can be selected and executed using the procurement application to complete all or portions of the project.

In an embodiment, the data dashboard includes a listing of outstanding tasks that can be selected and executed to complete the project. For example, each project may include multiple tasks in order to complete the project. In an embodiment, interface objects are generated and displayed, and selecting a particular interface object allows assigning a particular task to one or more users. Examples of interface objects include icons, text, and hyperlinks to specific tasks, features or functions of the application.

In an embodiment, the data dashboard may present different information relevant to executing the project. For example, the dashboard may include identification information for the different actions. Each of the different actions may include one or more user interface objects that are programmed to respond to a selection of the particular action and to cause executing that particular action. Further, the dashboard may include a number of times that each action identifier has been selected for the project or for all the projects managed by the procurement application program.

2. Computer Systems

FIG. 1 is a block diagram of computer systems that may be used in an embodiment.

In the example of FIG. 1, computer systems 100 include a client computer 102 and an application server 110, communicatively coupled via a network 104. The client computer 102 may be any suitable computing device that allows the presentation of project information to a user. For example, the client computer 102 may represent a desktop computer, laptop, tablet, smartphone, or other computing device. The client computer 102 may be associated with an entity that is a project manager, project administrator, project team member, project contributor, or any other entity that may need access to procurement information associated with a project.

The application server 110 may be implemented on any suitable computing device, different than the computing device represented by the client computer 102. Application server 102 may represent one or more physical computers or one or more processes, threads or virtual computing instances. The application server 110 may be associated with a different entity than the entity associated with the client computer 102. For example, application server 110 may be providing features in a software-as-a-service arrangement where, although the software provided by the application server 110 is not directly under the control or management by the entity associated with the client computer 102, the application server 110 provides procurement application features as part of a contractual agreement.

The network 104 broadly represents any combination of one or more local area networks, wide area networks, internets and the like that is programmed to transmit data between the client computer and application server 110 using protocols that are compatible with both systems.

The application server 110, in the example of FIG. 1, includes a procurement application 112 and a project table database 130. Although the embodiment as shown in FIG. 1 shows both the procurement application 112 and the project table database 130 hosted or stored at the application server 110, the project table database 130 may be stored separately from the application server 110, not shown in FIG. 1.

The procurement application 112 may be used by buyers and purchasing managers, as well as chief executive officers and chief financial officers of corporations. For example, the project action proposal system may include enabling e-commerce shopping within a business procurement application from a shopper perspective. A shopper can be a company employee who is attempting to purchase one or more items on behalf of the company. Computer-implemented procurement applications are available on the internet and the software solutions available from Coupa Software Incorporated of San Mateo, Calif. are an example. While a procurement application is used herein for purposes of illustrating a clear example, other embodiments may use other kinds of applications.

The procurement application 112 includes executable digital instructions that implement the various features of the procurement application 112. In one embodiment, a set of base application instructions 114 provides various foundation features for automated procurement activities and also implements the functions described herein of the project action proposal system. The base application instructions 114 may provide different features embodied in different executable instruction sets, as discussed in greater detail following:

Requisition Instructions.
Allows the creation of purchase orders, initiating a sale of goods or services with a buying entity to a selling entity. The purchase order may be transmitted electronically, by paper copy, or other method.

Approval Chain Instructions.
Specifies from whom permission is needed, before an order is allowed to proceed.

Inventory Instructions.
Maintains a tally of good or services available from or to buying or selling entities.

Invoicing Instructions.
Facilitates the payment for the sale or purchase of goods or services.

The project table database 130 includes information on projects managed by the procurement application 112. For example, the project table database 130 may include one or more self-executing project tables. The self-executing project tables represent project values, as well as one or more actions associated with each project, that may be used to satisfy the project.

Figure 2:
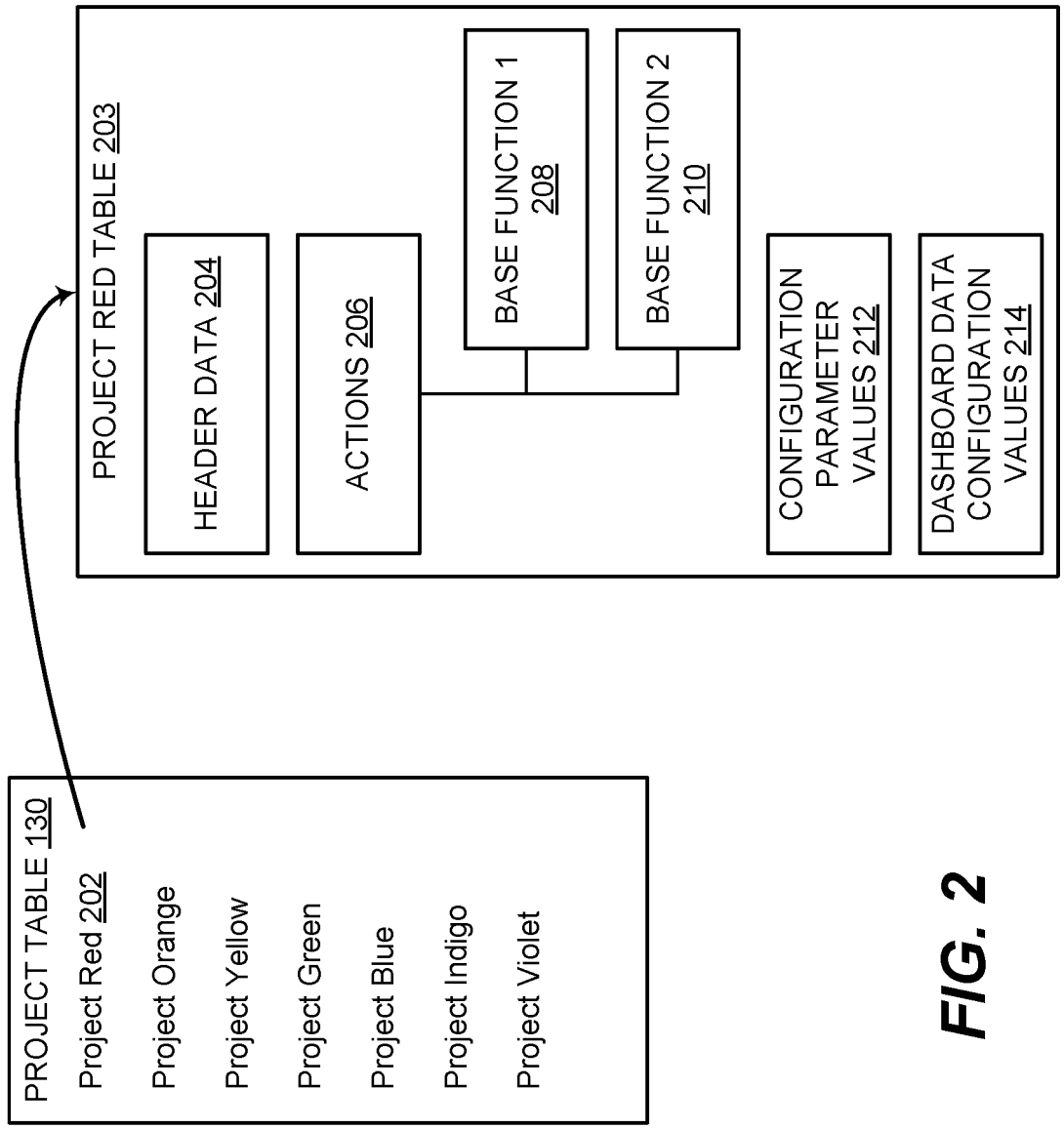
FIG. 2 shows an example of a data structure used to implement a project table, in an embodiment.

FIG. 2 shows an example of a data structure used to implement the project table database 130, in an embodiment. The project table of FIG. 2 shows self-executing project tables associated with various project identifiers, such as identifiers Project Red 202, Project Orange, Project Yellow, Project Green, Project Blue, Project Indigo, and Project Violet. An expanded view of information stored in the self-executing project table associated with the Project Red 202 identifier is also shown in FIG. 2. For example, a Project Red Self-Executing Table 203 includes header data 204, actions data 206, configuration parameter values 212, and dashboard data configuration values 214. The actions data 206 is associated with a base function 1 208 and a base function 2 210. For example, the base function 1 208 and the base function 2 210 may correspond to actions that achieve the same or similar purposes in the procurement system, provided as part of the base application instructions 114.

In an embodiment, header data may include multiple pieces of information which allow a snapshot view of how a particular project is progressing. For example, the header data may indicate a project type. Some example of project types include:
  Converting expenses in a category to requisitions;
  Converting non-PO invoices to PO-backed invoices;
  Getting more categories under contract;
  More electronic invoicing in a specified category;
  The header data may also include additional information, such as:
  Commodities and expense categories included in the project;
  Types of transactions (e.g., expenses, requisitions);
  Regions of parties included with the project;
  Regions of suppliers included;
  Suppliers included in the project; and
  Tagged transactions.

Returning to FIG. 1, in one embodiment, the project action proposal system that is further described functionally herein can be implemented using a set of project management instructions 116, project management instructions 118, action suggestion instructions 120 and trend determination instructions 122, in combination with project table 130. In an embodiment, the project management instructions 116 includes instructions that allow the client computer 102 to modify one or more values for a project stored in the project table database 130. For example, the project management instructions 116 may retrieve from a project stored in the project table database 130 header data, action identifiers, configuration parameter values, or dashboard data configuration values. The project management instructions 116 allows modification of one or more of these values; either directly by selecting one of the header data, action identifiers, or configuration parameter values or indirectly by selecting an action that causes changes to the header data, action identifiers, or configuration parameter values.

The presentation instructions 118 includes instructions on what and how to present information at the client computer 102. For example, the presentation instructions 118 causes, on a graphical user interface displayed at the client computer 102, displaying widgets or interface objects that allow modification of values for a project or provide a status update for the project. The status update may include an activity feed, a list of project identifiers, tasks, or trends associated with the project.

The action suggestion instructions 120 includes instructions that determine, for a particular project, what are one or more actions that may be taken to satisfy the project. For example, a particular project may already be associated with an initial action to complete a particular purpose of the project. The particular purpose may be associated with one or more actions provided by the base application instructions 114 to achieve the particular purpose. A subset of all the actions provided by the base application instructions 114 that satisfy the particular purpose may be selected by the action suggestion instructions 120. The selected actions may further be filtered or sorted using one or more criteria, such as success of previous actions in similar situations, actions specified by an administrator as preferred, newly included actions in the procurement application, or other criteria.

The trend determination instructions 122 includes instructions that determine whether there are trends associated with one or more actions. For example, the trend information may indicate that a first action is taken more frequently than a second action, even though the first and second actions achieve the same purpose.

3. Example of Projects and Associated Actions

In an embodiment, the procurement application 112 may offer more than one action that may satisfy a project. The one or more actions may achieve the same or similar purposes as another action, but not necessarily so. Further, not all actions may apply to all projects. Some examples of actions taken with various application functions provided by the procurement application 112 include:

Create Sourcing Event to Source the Category;

If a project has a defined category or categories, to reduce spend for the project the project action proposal tool may suggest which categories to source based on top items, and provide an interface object (e.g., button, hyperlink) associated with an application function of the procurement application 112 to "source this". Clicking the interface item may facilitate (shortcut) creating the sourcing event, bringing in the relevant item data details and previous supplier details.

Create Expense Policy;

If a project goal is set to reduce any spend that is not pre-approved in a defined category or categories, then the project action proposal tool may suggest creating an expense policy to inform users of not expensing from this category and to create an approvable purchase request instead before buying an item in this category. The project action proposal system may provide an interface object to "create expense policy" associated with an application function of the procurement application 112. Clicking the interface object may facilitate (shortcut) creating an expense policy for that category, saving the user clicks and reducing the need to learn how to navigate through administrative tools.

Add Approval Chain;

If a project goal is set to reduce any spend in a defined category or categories, then the project action proposal tool may suggest adding an approval chain to any request, expense, or invoice based on the category to ensure oversight. The project action proposal system may provide an interface object to "add approval chain" associated with an application function of the procurement application 112. Clicking the interface object may facilitate (shortcut) creating an approval chain for that category, saving the user clicks and reducing the need to learn how to navigate through administrative tools, such as reducing the number of screens or steps that a user is needed to navigate before the approval chain is added.

Create Contract;

If a project goal is set to reduce any spend in a defined category or categories, then the project action proposal tool may suggest adding a contract based on the category to ensure contract validation and tracking against the contract spend maximum and milestones. The project goal may provide an interface object to "create a contract" associated with an application function of the procurement application 112. Clicking the interface object may facilitate (shortcut) creating a contract for that supplier or category, saving the user clicks and reducing the need to learn how to navigate through administrative tools.

Create Catalog Items or Punchouts;

If a project goal is to ensure spend is pre-negotiated in a defined category or categories, then the project action proposal tool may suggest adding discreet items or punchout catalogs to ensure purchases are for pre-loaded and pre-negotiated suppliers and pricing. The project action proposal system may provide an interface object to "create an item" or "create a punchout" associated with one or more application functions of the procurement application 112. Clicking the interface object may facilitate (shortcut) creating purchasable items for a supplier or category, saving the user clicks and reducing the need to learn how to navigate through administrative tools.

Create Announcement;

If a project goal is set to reduce any spend in a defined category or categories, then the project action proposal tool may suggest creating an announcement using the procurement software (existing tool in the product) to inform users of optimal purchasing behavior or to direct them to policies or procedures that are relevant to the project success. The project action proposal tool may provide an interface object to "create announcement to my employees" associated with an application function of the procurement application 112. Clicking the interface object may facilitate (shortcut) creating a company-wide announcement for that category, saving the user clicks and reducing the need to learn how to navigate through administrative tools.

Ask an Expert;

Facilitate creating an "ask the expert" category for a project's category that is associated with an application function of the procurement application 112. An "Ask the Expert" in the project's category may allow users to get answers related to the project's category, and shortcutting the ability to set this up may ensure users could ask an expert about what policies to follow.

Create a Freeform Requisition;

If a project involves purchasing items or services, then the ability to create a request for those items or services as a shortcut from the project action proposal system may help accomplish the project goals with fewer clicks and defaulting project fields and categories to the purchase request, plus automatically tag and link the request to the project for future tracking and reporting.

Create a Form;

If a project goal is to ensure spend or actions are pre-approved, then the project action proposal tool may suggest adding discreet forms to ensure that action requests have all the necessary fields and are approved before someone takes action. The project action proposal system may provide an interface object to "create form" associated with an application function of the procurement application 112. Clicking the interface object may facilitate (shortcut) creating an approvable form (approvable forms is an existing feature) that may be available to users to request actions or services to help accomplish the project, saving the user clicks and reducing the need to learn how to navigate through administrative tools.

Change a Configuration;

One example of a configuration is invoice tolerances. If part of the project is to reduce spend in a category and invoice overages are assessed to be high in the project category, then the system may suggest the user "edit invoice tolerances" associated with an application function of the procurement application 112 to ensure invoice overages are reviewed by approvers. Clicking this "edit invoice tolerances" interface object may facilitate (shortcut) editing invoice tolerances, saving the user clicks and reducing the need to learn how to navigate through administrative tools to ensure invoice overages do not pass through unapproved.

Create an Expense Category;

If a project goal is set to track any spend that is not pre-approved, then the project action proposal tool may suggest creating an expense category to help track and report on expenses in a category or sub-category that does not exist yet. The project action proposal system may provide an interface object to "create expense category" associated with an application function of the procurement application 112. Clicking the interface object may facilitate (shortcut) creating an expense category, saving the user clicks and reducing the need to learn how to navigate through administrative tools to start tracking and reducing expenses at a more granular level.

Review Approval Chains;

If a project goal is set to reduce time-to-approver in a defined category or categories, then the project action proposal tool may suggest reviewing existing approval chain to any request, expense, or invoice based on the category to ensure approval chains for the category are not optimal. The project action proposal system may provide an interface object to "review approval chains" associated with an application function of the procurement application 112. Clicking the interface object may facilitate (shortcut) viewing approval chains relevant to the project's category, saving the user clicks and reducing the need to learn how to navigate through administrative tools.

Tools;

As an example, the Supplier Directory is a tool. If part of the project is to increase electronic invoicing percentages, then the project action proposal system may suggest the user "Connect to more suppliers" associated with an application function of the procurement application 112. Clicking this "Connect to more suppliers" interface object may facilitate (shortcut) taking the user to the supplier directory or supplier opportunities to link to more suppliers, saving the user clicks and reducing the need to learn how to navigate through administrative tools to ensure invoice overages do not pass through unapproved.

Below are two examples of projects that may be established using the project action proposal system. These examples are meant to be illustrative and not exclusive of the kinds of projects that may be handled by the project action proposal system.

Example Project 1: Switch Reimbursements from Expense-Based to Requisition-Based As an example, a particular project may be to shift purchases and reimbursements for payment of the purchases from an expense-based action to a requisition-based action. These actions may both satisfy the same purpose, for example, in both the expense-based and requisition-based actions, a good or service is purchased to help an organization achieve its business purpose. In the expense-based action, an employee may pay for a service or good themselves or using an organization payment method. In the requisition-based action, an employee may use a portal or other organization pre-approved process to purchases good or services.

By using a requisition-based action however, the project action proposal system may provide a technical benefit of helping to reduce errors in the project action proposal system when compared to an expense-based action. For example, while using the expense-based action of the procurement application 112, a user provides information for reimbursement themselves. This results in errors by the user in getting reimbursed, such as through missing information or simply typographic errors of information. However, by using the requisition-based action in the project action proposal system, information provided is validated so that information is provided in the proper format with all the required information. This reduces computing resources used by the overall project action proposal system, by validating information for the purchase of goods or services, before it is processed by the procurement application 112 and possibly requiring the project action proposal system to take remedial measures to correct user input.

Further, the project action proposal system may provide trend information relevant to the particular project. For example, trend information that reflects the number of expense-based actions taken as compared to the number of requisition-based actions. This may indicate the progress of success towards the project.

Example Project 2: Increase Electronic Invoicing

As another example, a particular project may be to shift invoicing from a paper-based method to an electronic-based method. Electronic-based invoicing may provide technical benefits, such as allowing faster processing of invoicing information, prevent data validation errors by reducing the need for manual information entry or optical character recognition errors, or provide tracking of invoice progress.

Actions that may be suggested by the project action proposal system to increase electronic invoicing may include an action to invite more suppliers to register with the procurement application 112, add a new approval chain for non-electronic-invoices, or report users or groups of users that continue to persist in using paper-based methods.

Figure 3:
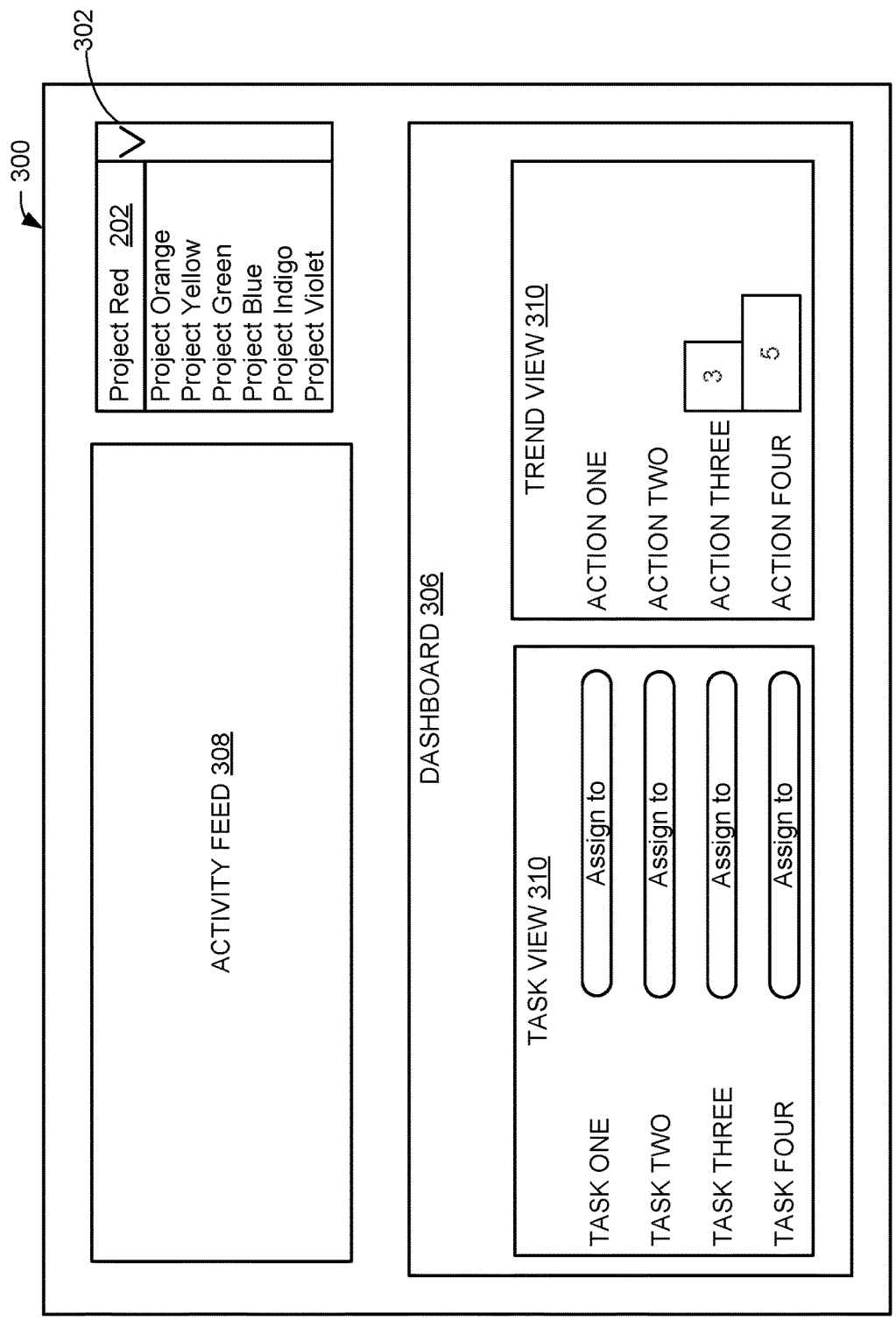
FIG. 3 shows a screen capture of example output from presentation instructions.

4. Example Implementation of a Project Action Proposal System Using a User Interface FIG. 3 shows a screen capture of example output from presentation instructions. For one embodiment, FIG. 3 shows a screen capture 300 of example output from the presentation instructions 118 for features of the project action proposal system. The presentation instructions 118 may include code that when executed, cause displaying output of the display shown in FIG. 3 by implementing the instructions or algorithms that are described in other sections herein.

A user-interface widget, shown in FIG. 3 as a drop-down menu 302, allows the selection of different project identifiers, such as the example project identifiers shown in FIG. 2. For example, the user-interface widget may be programmed to list different project identifiers for projects managed by the procurement application 112. As shown in FIG. 3, a particular project identifier for a project managed by the procurement application 112 representing the Project Red 202 is selected using the drop-down menu 302. However, any suitable user interface elements, such as buttons, text-entry box, or other user interface element may be substituted for the drop-down menu 302. The particular project identifier may correspond to a particular self-executing project table that may be executed using the procurement application.

An activity feed portion 308 shows a listing of one or more changes or progress made to satisfy the project identified by the selected project identifier, such as changes that affect Project Red 202. Some examples of information shown in the activity feed portion 308 include:

List All Transactions Related to the Project. For example, a project may involve one or more transactions or agreements to buy or sell goods or services.

Transaction Status Changes. For example, transactions may include status of in-progress, completed, paid for, or other status.

Comments on Transactions. For example, comments that users of the procurement system believed to be relevant to any specific transaction.

Comments on the Project.

Tasks Related to the Project, Plus Updates to Tasks. For example, some projects may be divided into one or more tasks, that make it easier to manage the overall project by tracking progress of its component tasks.

Ability to Create New Comments.

A dashboard portion 306 shows details for the selected project in a graphical user interface dashboard. The dashboard portion 306 is an interactive display, meaning that as changes are made to values associated with the selected project, the dashboard portion 306 may be updated according to the changes made. The dashboard portion 306 may display a current progress of the project towards completion. For example, the dashboard portion 306 may include an area showing then-current values associated with a selected project identifier. The then-current values may change, depending on a user's interactions with one or more features of the procurement application.

The dashboard portion 306 may include a task view portion 310. The task view portion 310 lists any outstanding tasks associated with the selected project. Outstanding tasks shown in the task view portion 310 may include an interface object, such as a button, programmed in response to the outstanding task that allows selecting one or more users of the procurement application 112 to assign each respective outstanding task. For example, when the "Assign to" button is selected next to Task One, an option is provided to assign responsibility of completing Task One to a user or a group of users, by providing an identifier for the user or the group of users.

A trend view portion 210 lists analytics regarding the progress of the selected project or a category of projects. The trend view portion 210 may indicate the number of times actions associated with the selected project are selected by users of the procurement application 112. For example, as shown in FIG. 2, action one was never selected, action two was selected three times, action three was selected five times, and action four was selected twice.

Other analytics may also be presented by the trend view portion 210. For example, the trend view portion 210 may indicate expense, requisition, or invoice trends in a category of projects. The trend view portion 210 may also indicate other beneficial trends in the procurement application 112, such as the increased use of electronic invoicing in a project. The trend view portion 210 may also include heat maps indicating usage of different actions, whether by suppliers, buyers, or particular users of the procurement application 112.

5. Example Method for a Project Action Proposal System

Figure 4:
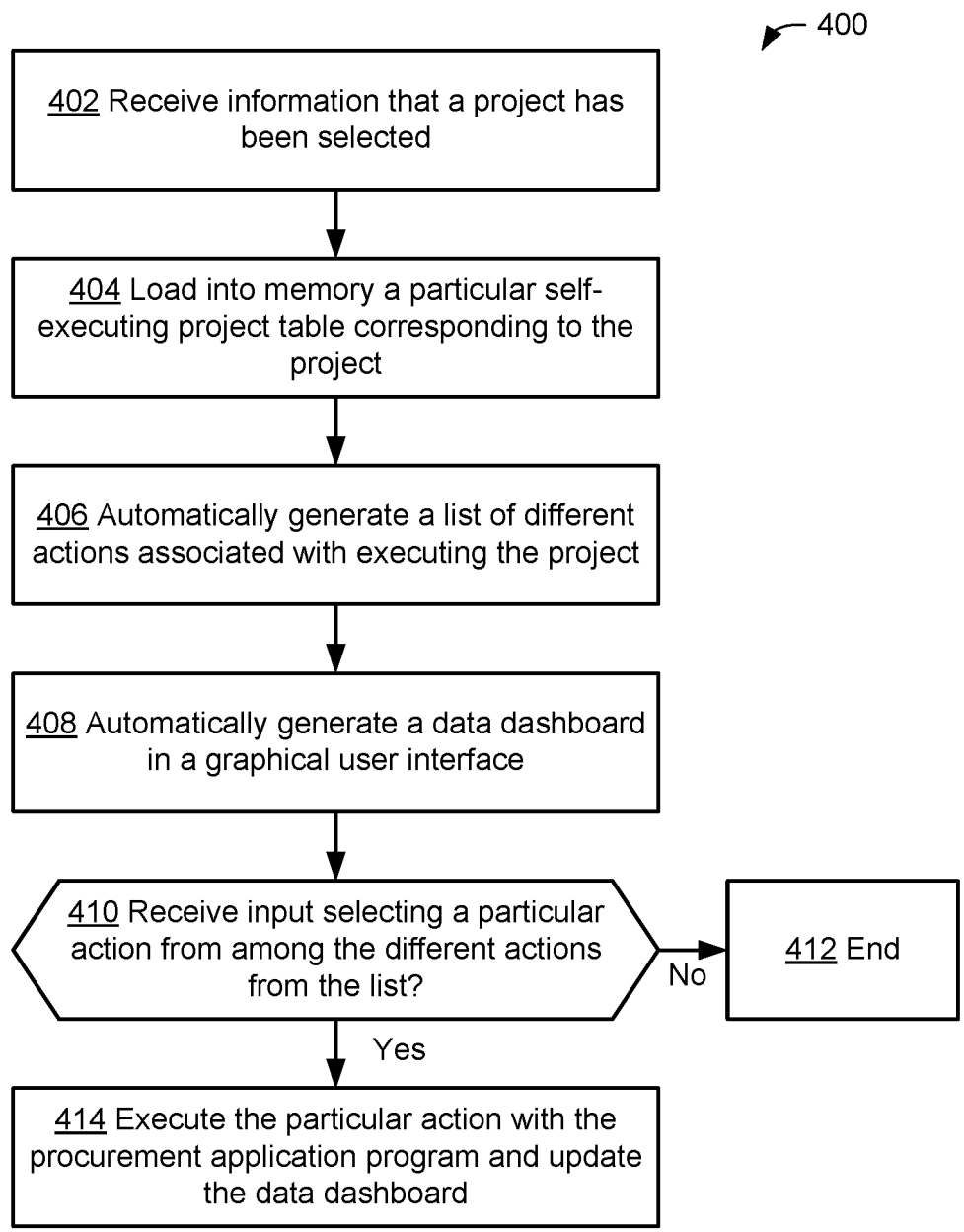
FIG. 4 is a flowchart that illustrates an example method of proposing actions in a computer system.

FIG. 4 is a flowchart that illustrates an example method of proposing actions in a project action proposal system.

For purposes of illustrating a clear example, FIG. 4 is described herein in the context of FIG. 1, but the broad principles of FIG. 4 can be applied to other systems having configurations other than as shown in FIG. 1. Further, FIG. 4 and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 4 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

The example process 400 of FIG. 4 initiates at step 402, in which the project action proposal system receives information that a project has been selected. For example, a user at the client computer 102 selects from the drop-down menu 302 indicating a project of interest.

In step 404, the project action proposal system loads into memory a particular self-executing project table corresponding to the project. This may include header data and action identifiers for actions that may be performed by the procurement application 112.

In step 406, the project action proposal system automatically generates a list of different actions associated with executing the project. For example, the client computer 102 may indicate, based on the selection of the project, that a subset of the actions available from the procurement application 112 are available to the project.

In step 408, the project action proposal system automatically generates a data dashboard in a graphical user interface. The data dashboard may present current information associated with the project, before any requests to modify information associated with the project are received by the project action proposal system from the client computer 102.

In step 410, the project action proposal system determines whether there is input received indicating selection at the client computer 102 of a particular action from among the different actions. If there is no input indicating selection of a particular action, in step 412, the process is completed. Other modifications to values associated with the project may be made.

In step 414, the project action proposal system executes the particular action with the procurement application 112 and updates the data dashboard. For example, once the particular action has been initiated in response to the input, one or more changes to values associated with the project are made. The changes to the values are shown in the data dashboard.

6. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
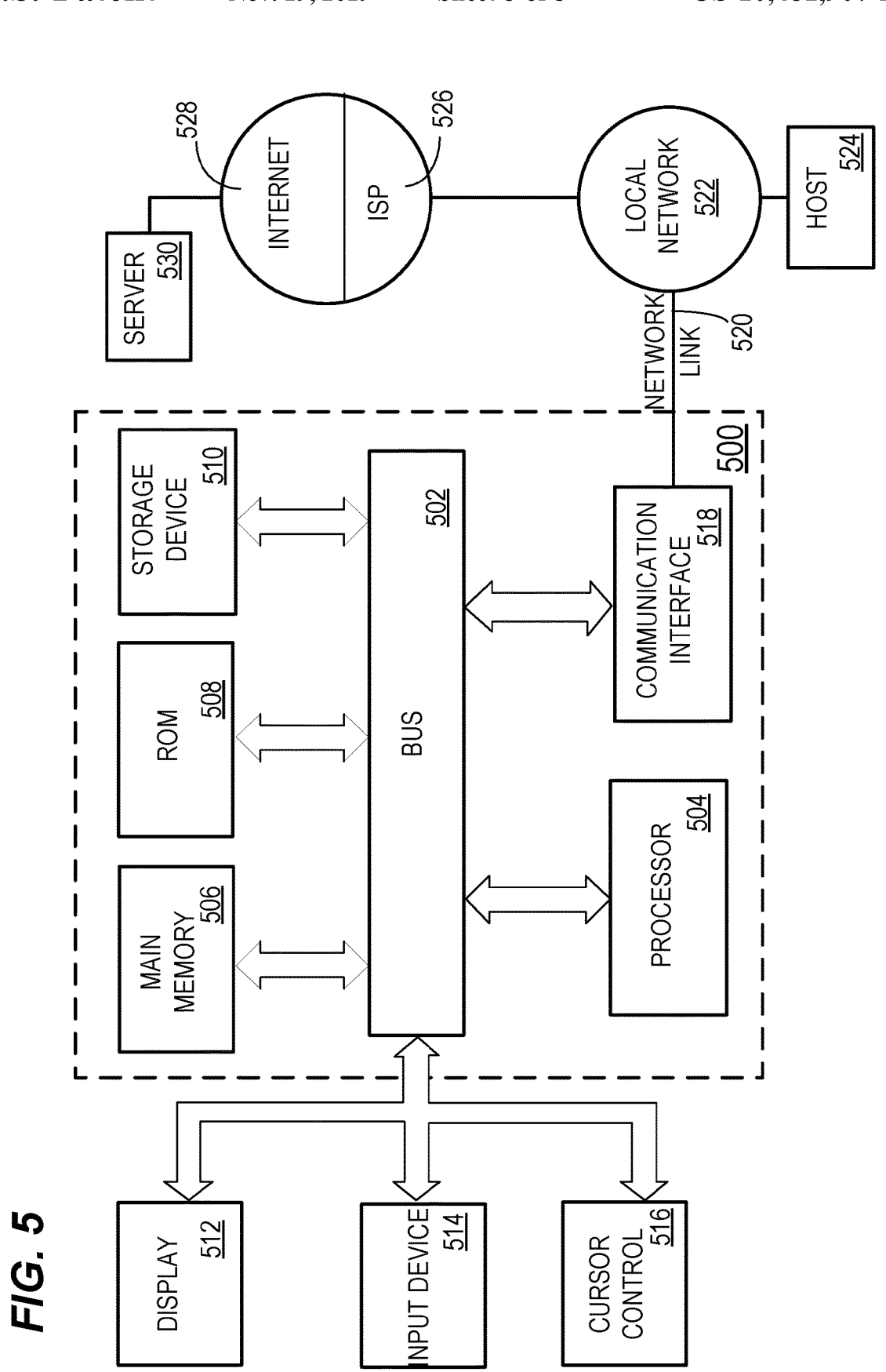
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method, comprising:
   creating and saving in a database a specific project table that corresponds to a specific project and comprises action identifiers for completing the specific project;
   causing, by a processor, displaying through a first screen of a graphical user interface (GUI) a list of project identifiers associated with a procurement computer system;
   receiving, by the processor, a first selection of one of the project identifiers representing a project through the first screen;
   retrieving, in response to the first selection, a project table corresponding to the project from the database and identifying from the project table a list of action identifiers of a list of actions associated with the project, utilized to complete the project,
   a first action from the list being designated for adoption instead of a second action from the list currently in use that has the same or a similar purpose as the first action,
   the project comprising achieving the same or similar purpose through at least one of the actions from the list designated for adoption;
   causing displaying through the first screen:
      a first action identifier of the first action,
      a first indication of a first number of times the first action has been executed since a beginning of the project,
      a second action identifier of the second action,
      a second indication of a second number of times the second action has been executed since the beginning of the project, and
      a progress report indicating a degree of successful completion of the project based on at least the first and second numbers of times;
   receiving a selection of the first action identifier or the second action identifier through a second screen of the GUI;
   in response to the selection, executing the first action and updating the first number of times or executing the second action and updating the second number of times.

2. The computer-implemented data processing method of claim 1, the first action being a new action, an action specified by an administrator as preferred, or an action previously used to successfully accomplish the purpose.

3. The computer-implemented data processing method of claim 1, further comprising causing displaying through the first screen a list of task identifiers of outstanding tasks of the project, each corresponding to a portion of the project, and at least one selectable option to assign at least one of the outstanding tasks.

4. The computer-implemented data processing method of claim 1,
   the same or similar purpose being related to reimbursement,
   the list of actions including expense-based reimbursement and requisition-based reimbursement.

5. The computer-implemented data processing method of claim 1, further comprising causing display through the first screen one or more comments on the project that have been entered by users.

6. The computer-implemented data processing method of claim 1, further comprising causing display through the first screen information regarding one or more procurement transactions conducted as a result of executing a set of the list of actions.

7. The computer-implemented data processing method of claim 1, further comprising causing displaying a selectable option through the second screen that enables creation of a tool educating users of at least the first action.

8. The computer-implemented data processing method of claim 1, further comprising causing displaying a selectable option through the second screen that enables selecting the first action identifier or the second action identifier.

9. The computer-implemented data processing method of claim 1, further comprising:
   receiving a goal of saving time, money, or other resources for a certain project;
   suggesting a certain action based on the goal for association with the certain project.

10. The computer-implemented data processing method of claim 9, further comprising designating the certain action for adoption for the certain project.

11. The computer-implemented data processing method of claim 9, further comprising:
    creating a certain project table that corresponds to the certain project in the database;
    adding a certain action identifier of the certain action to the certain project table.

12. One or more non-transitory storage media storing instructions which, when executed by one or more computing devices, cause performance of a method, the method comprising:
    creating and saving in a database a specific project table that corresponds to a specific project and comprises action identifiers for completing the specific project;
    causing displaying through a first screen of a graphical user interface (GUI) a list of project identifiers associated with a procurement computer system;
    receiving a first selection of one of the project identifiers representing a project through the first screen;
    retrieving, in response to the first selection, a project table corresponding to the project from the database and identifying from the project table a list of action identifiers of a list of actions associated with the project, utilized to complete the project, a first action from the list being designated for adoption instead of a second action from the list currently in use that has the same or a similar purpose as the first action, the project comprising achieving the same or similar purpose through at least one of the actions from the list designated for adoption;

causing displaying through the first screen:
- a first action identifier of the first action,
- a first indication of a first number of times the first action has been executed since a beginning of the project,
- a second action identifier of the second action,
- a second indication of a second number of times the second action has been executed since the beginning of the project, and
- a progress report indicating a degree of successful completion of the project based on at least the first and second numbers of times;

receiving a selection of the first action identifier or the second action identifier through a second screen of the GUI;

in response to the selection, executing the first action and updating the first number of times or executing the second action and updating the second number of times.

13. The one or more non-transitory storage media of claim 12, the method further comprising causing display through the first screen information regarding one or more procurement transactions conducted as a result of executing a set of the list of actions.

14. The one or more non-transitory storage media of claim 12, the method further comprising causing displaying a selectable option through the second screen that enables creation of a tool educating users of at least the first action.

15. The one or more non-transitory storage media of claim 12, the method further comprising causing displaying a selectable option through the second screen that enables selecting the first action identifier or the second action identifier.

16. The one or more non-transitory storage media of claim 12, the method further comprising:
- receiving a goal of saving time, money, or other resources for a certain project;
- suggesting a certain action based on the goal for association with the certain project.

17. The one or more non-transitory storage media of claim 16, the method further comprising designating the certain action for adoption for the certain project.

18. The one or more non-transitory storage media of claim 16, the method further comprising:
- creating a certain project table that corresponds to the certain project in the database;
- adding a certain action identifier of the certain action to the certain project table.

19. The one or more non-transitory storage media of claim 12, the method further comprising causing displaying through the first screen a list of task identifiers of outstanding tasks of the project, each corresponding to a portion of the project, and at least one selectable option to assign at least one of the outstanding tasks.

20. The one or more non-transitory storage media of claim 12, the method further comprising causing display through the first screen one or more comments on the project that have been entered by users.

* * * * *